United States Patent
Ke et al.

(10) Patent No.: US 8,830,956 B2
(45) Date of Patent: Sep. 9, 2014

(54) METHOD OF CONFIGURING THE ABSOLUTE GRANT MAPPING TABLE FOR DRIFTING RADIO NETWORK CONTROLLER

(75) Inventors: Yazhu Ke, Shenzhen (CN); Qiang You, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 245 days.

(21) Appl. No.: 12/746,060

(22) PCT Filed: Dec. 10, 2007

(86) PCT No.: PCT/CN2007/003502
§ 371 (c)(1),
(2), (4) Date: Jun. 3, 2010

(87) PCT Pub. No.: WO2009/079811
PCT Pub. Date: Jul. 2, 2009

(65) Prior Publication Data
US 2010/0260104 A1 Oct. 14, 2010

(51) Int. Cl.
*H04W 4/00* (2009.01)
*H04W 72/04* (2009.01)

(52) U.S. Cl.
CPC ................................. *H04W 72/0406* (2013.01)
USPC .......................... 370/331; 370/328; 455/432.1

(58) Field of Classification Search
CPC .. H04W 72/0406; H04W 36/10; H04W 92/14
USPC ................................. 370/328, 331; 455/432.1
See application file for complete search history.

(56) References Cited

U.S. PATENT DOCUMENTS

| 6,889,050 | B1 * | 5/2005 | Willars et al. | 455/452.2 |
| 2002/0094833 | A1 * | 7/2002 | Lieshout et al. | 455/522 |
| 2002/0097740 | A1 * | 7/2002 | Choi et al. | 370/441 |
| 2003/0013443 | A1 * | 1/2003 | Willars et al. | 455/432 |

(Continued)

FOREIGN PATENT DOCUMENTS

| CN | 1829388 A | 9/2006 |
| CN | 1921336 A | 2/2007 |

(Continued)

OTHER PUBLICATIONS

High Speed Uplink Packet Access (HSUPA) White Paper, Rhode & Schwarz, pp. 1-38, C. Gessner Jan. 2006.
International Search Report, Sep. 2008.

*Primary Examiner* — Omer S Mian
(74) *Attorney, Agent, or Firm* — Banner & Witcoff, Ltd.

(57) ABSTRACT

A method for configuring an absolute grant mapping relationship table for a drift radio network controller, comprises: a serving radio network controller informing the drift radio network controller of the absolute grant mapping relationship table used by an enhanced-dedicated channel absolute grant channel (E-AGCH) by signaling; and the drift radio network controller returning a response message to the serving radio network controller after storing the information configured. The present invention guarantees that absolute grant values corresponding to the Node B and the user equipment are obtained from the same absolute grant mapping relationship table, i.e. from the same table of relationships between absolute grant values and indexes, and the allocation and use of the power resource by them are consistent, so that efficient use of resources and security of the system are guaranteed.

5 Claims, 1 Drawing Sheet

(56) References Cited

U.S. PATENT DOCUMENTS

| | | | |
|---|---|---|---|
| 2007/0047452 A1* | 3/2007 | Lohr et al. | 370/242 |
| 2007/0047501 A1 | 3/2007 | Usuda | |
| 2008/0008152 A1* | 1/2008 | Lohr et al. | 370/342 |
| 2009/0059892 A1* | 3/2009 | Marinier et al. | 370/349 |
| 2010/0128663 A1* | 5/2010 | Kuroda et al. | 370/328 |
| 2010/0278074 A1* | 11/2010 | Ke et al. | 370/254 |

FOREIGN PATENT DOCUMENTS

| | | |
|---|---|---|
| EP | 1758264 A2 | 2/2007 |
| KR | 20070055004 A | 5/2007 |
| WO | 2007/043455 A1 | 4/2007 |
| WO | WO2007043455 * | 4/2007 |

\* cited by examiner

METHOD OF CONFIGURING THE ABSOLUTE GRANT MAPPING TABLE FOR DRIFTING RADIO NETWORK CONTROLLER

TECHNICAL FIELD

The present invention relates to the field of a radio communication system, and especially to a method for configuring an absolute grant mapping relationship table, which can be used by an enhanced-dedicated channel absolute grant channel (E-AGCH), for a drift radio network controller.

BACKGROUND OF THE RELATED ART

An access network includes one or more radio network subsystems, each of which is a sub-network in the access network and comprises a radio network controller and one or more Node Bs (a Node B is also referred to as a base station). The radio network controller is a network element responsible for controlling radio resources in the access network; and the main functions of the Node B includes performing processing at the physical layer of an air interface, as well as some basic management operations for radio resources. When communication relationships are established between a user equipment (UE) and a plurality of radio network controllers, different radio network controllers are connected via Iur interfaces, where a radio network controller responsible for communication between the UE and a core network is referred to as a serving radio network controller, and a radio network controller responsible for signaling and data transmission for the UE but not responsible for the communication between the UE and the core network is referred to as a drift radio network controller.

During the optimization of the techniques in present systems, the high speed uplink packet access technique, into which a high order modulation mode of 16QAM has been introduced so far, has been continuously evolving to improve the quality of users' experiences and the throughput of the system. The introduction of the high order modulation mode of 16QAM means that data can be transmitted by users at a higher rate and accordingly higher power is required to meet the requirement of service quality, which leads to great change in the method of uplink power control and how the Node B determines a grant.

There are two methods for the Node B to determine a grant, one is absolute grant, and the other is relative grant. Regardless of whether it is absolute grant or relative grant, it is actually that the Node B indicates a usable power resource (which may correspond to an absolute grant value) to the UE based on factors such as allocable resources in the cell, the user's channel quality indication, and required data size, and then informs the UE of the usable power resource through a index or by way of relative rising/lowering. The UE determines a rate at which data can be transmitted based on the power resource. It can be seen that the Node B needs to know explicitly a corresponding relationship between the index and the absolute grant value to ensure that the UE may determine the rate at which data can be transmitted within an upper limit of the power that the Node B expects the UE to transmit.

After 16QAM is introduced, the previous corresponding relationships between indexes and grant values (powers) are no longer able to meet the requirement, therefore the 3GPP (the $3^{rd}$ generation partnership project) protocol has introduced new tables of corresponding relationships between indexes and grant values for absolute grant and relative grant respectively, i.e., higher grant values have been introduced to meet the requirement of higher rate. At present, there are two absolute grant mapping relationship tables specified in the protocol for the E-AGCH to use, as shown in tables 1 and 2, where the absolute grant value mapping table shown in table 1 is the table of the relationships between absolute grant values and indexes before 16QAM is introduced, and the absolute grant value self-adapting mapping table shown in table 2 is the table of the relationships between absolute grant values and indexes after 16QAM is introduced. Two items of index numbers and absolute grant values are included in the content of each table.

TABLE 1

| Absolute grant value mapping table | |
|---|---|
| Absolute Grant Value | Index |
| $(168/15)^2 \times 6$ | 31 |
| $(150/15)^2 \times 6$ | 30 |
| $(168/15)^2 \times 4$ | 29 |
| $(150/15)^2 \times 4$ | 28 |
| $(134/15)^2 \times 4$ | 27 |
| $(119/15)^2 \times 4$ | 26 |
| $(150/15)^2 \times 2$ | 25 |
| $(95/15)^2 \times 4$ | 24 |
| $(168/15)^2$ | 23 |
| $(150/15)^2$ | 22 |
| $(134/15)^2$ | 21 |
| $(119/15)^2$ | 20 |
| $(106/15)^2$ | 19 |
| $(95/15)^2$ | 18 |
| $(84/15)^2$ | 17 |
| $(75/15)^2$ | 16 |
| $(67/15)^2$ | 15 |
| $(60/15)^2$ | 14 |
| $(53/15)^2$ | 13 |
| $(47/15)^2$ | 12 |
| $(42/15)^2$ | 11 |
| $(38/15)^2$ | 10 |
| $(34/15)^2$ | 9 |
| $(30/15)^2$ | 8 |
| $(27/15)^2$ | 7 |
| $(24/15)^2$ | 6 |
| $(19/15)^2$ | 5 |
| $(15/15)^2$ | 4 |
| $(11/15)^2$ | 3 |
| $(7/15)^2$ | 2 |
| ZERO_GRANT* | 1 |
| INACTIVE* | 0 |

TABLE 2

| Absolute grant value self-adapting mapping table | |
|---|---|
| Absolute Grant Value | Index |
| $(377/15)^2 \times 4$ | 31 |
| $(237/15)^2 \times 6$ | 30 |
| $(168/15)^2 \times 6$ | 29 |
| $(150/15)^2 \times 6$ | 28 |
| $(168/15)^2 \times 4$ | 27 |
| $(150/15)^2 \times 4$ | 26 |
| $(134/15)^2 \times 4$ | 25 |
| $(119/15)^2 \times 4$ | 24 |
| $(150/15)^2 \times 2$ | 23 |
| $(95/15)^2 \times 4$ | 22 |
| $(168/15)^2$ | 21 |
| $(150/15)^2$ | 20 |
| $(134/15)^2$ | 19 |
| $(119/15)^2$ | 18 |
| $(106/15)^2$ | 17 |
| $(95/15)^2$ | 16 |
| $(84/15)^2$ | 15 |
| $(75/15)^2$ | 14 |
| $(67/15)^2$ | 13 |
| $(60/15)^2$ | 12 |

TABLE 2-continued

Absolute grant value self-adapting mapping table

| Absolute Grant Value | Index |
|---|---|
| $(53/15)^2$ | 11 |
| $(47/15)^2$ | 10 |
| $(42/15)^2$ | 9 |
| $(38/15)^2$ | 8 |
| $(34/15)^2$ | 7 |
| $(30/15)^2$ | 6 |
| $(27/15)^2$ | 5 |
| $(24/15)^2$ | 4 |
| $(19/15)^2$ | 3 |
| $(15/15)^2$ | 2 |
| ZERO_GRANT* | 1 |
| INACTIVE* | 0 |

However, at present, the 3GPP protocol serving radio network controller only informs the UE of which absolute grant value mapping table to be used via the air interface, but does not inform the drift radio network controller via the Iur interface, and there is no explicit specification, as a result, grant values corresponding to the Node B and the UE are acquired from different tables of relationships between grant values and indexes, which leads to inconsistency between allocation and use of the power resource by them, and ultimately results in reduction of the system throughput due to overload or the UE insufficiently using the usable power resource.

SUMMARY OF THE INVENTION

The technical problem to be solved by the present invention is to provide a method for configuring an absolute grant mapping relationship table for a drift radio network controller to guarantee the efficient use of resources and security of the system.

To solve the above technical problem, the present invention provides a method for configuring an absolute grant mapping relationship table for a drift radio network controller, comprising:

a serving radio network controller informing the drift radio network controller of the absolute grant mapping relationship table used by an enhanced-dedicated channel absolute grant channel (E-AGCH) by signaling; and the drift radio network controller returning a response message to the serving radio network controller after storing the information configured.

Furthermore, the above method may have the following features: the absolute grant mapping relationship table is consistent with an absolute grant mapping relationship table of which an E-AGCH of a user equipment is informed via an air interface to use.

Furthermore, the above method may have the following features: the signaling sent by the serving radio network controller is a radio link setup request message or a radio link addition request message, and after receiving the radio link setup request message or the radio link addition request message, the drift radio network controller sends an radio link setup response message or a radio link addition response message to the serving radio network controller.

Furthermore, the above method may have the following features: the signaling sent by the serving radio network controller is a radio link reconfiguration preparation message, and after receiving the radio link reconfiguration preparation message, the drift radio network controller sends a radio link reconfiguration ready message to the serving radio network controller.

Furthermore, the above method may have the following features: the signaling sent by the serving radio network controller is a radio link reconfiguration request message, and after receiving the radio link reconfiguration request message, the drift radio network controller sends a radio link reconfiguration response to the serving radio network controller.

Furthermore, the above method may have the following features: informing a Node B of the absolute grant mapping relationship table used by the E-AGCH is implemented by including an identification number of the absolute grant mapping relationship table in the signaling, and the identification number is used to identify the absolute grant mapping relationship table used.

Furthermore, the above method may have the following features: the identification number of the absolute grant mapping relationship table ranges from 0 to 1.

Furthermore, the above method may have the following features: the absolute grant mapping relationship table is a table of relationships between absolute grant values and indexes before 16QAM is introduced, or a table of relationships between absolute grant values and indexes after 16QAM is introduced; content of the absolute grant mapping relationship table includes two items: index numbers and the corresponding absolute grant values.

Furthermore, the above method may have the following features: the serving radio network controller is a radio network controller responsible for communication between a user equipment and a core network; and the drift radio network controller is a radio network controller responsible for signaling and data transmission for the user equipment but not responsible for the communication between the user equipment and the core network.

It can be seen from the above that in the present invention, an absolute grant mapping relationship table of which a Node B under the control of a drift radio network controller is informed by a serving radio network controller to use is consistent with an absolute grant mapping relationship table of which a user equipment is informed by the serving radio network controller via an air interface to use, which guarantees that absolute grant values corresponding to the Node B and the user equipment are obtained from the same absolute grant mapping relationship table, i.e. from the same table of relationships between absolute grant values and indexes, and the allocation and use of the power resource by them are consistent, so that efficient use of resources and security of the system are guaranteed.

PREFERRED EMBODIMENTS OF THE PRESENT INVENTION

The main conception of the present invention is: a serving radio network controller configures an absolute grant mapping relationship table for a Node B that is under the control of a drift radio network controller (the configuration is directed to a UE), and makes the configured absolute grant mapping relationship table consistent with an absolute grant mapping relationship table of which the UE is informed via an air interface to use, to ensure that the absolute grant values corresponding to the Node B and the UE are obtained from the same absolute grant mapping relationship table, i.e. the same table of relationships between absolute grant values and indexes, so as to ensure the consistency between allocation and use of the power resource by them, thereby guaranteeing efficient use of resources and security of the system.

The serving radio network controller may inform the drift radio network controller of the absolute grant mapping relationship table that can be used by an E-AGCH by signaling. The signaling may be any one of the following messages: radio link setup request, radio link reconfiguration preparation, radio link reconfiguration request, and radio link addition request. The absolute grant mapping relationship table may be represented by its identification number. Values of indexes in the absolute grant mapping relationship table may be increased regularly from 0 or 1.

The technical scheme of the present invention will be described in further detail in the following in conjunction with accompanying drawings and embodiments.

Embodiment 1

Figure 1:
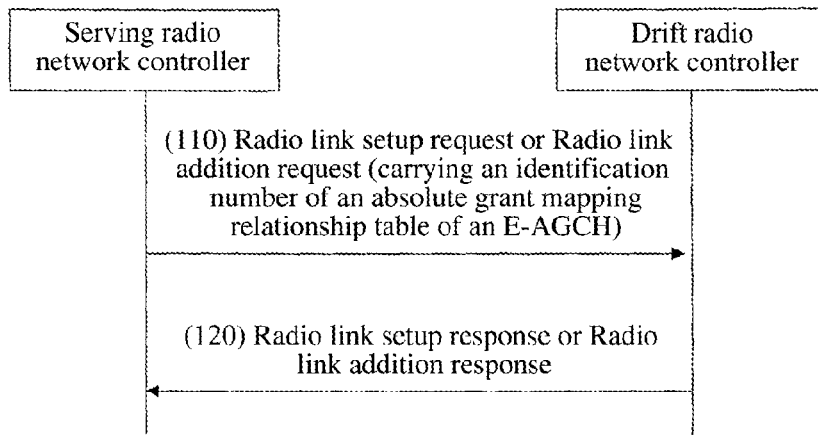
FIG. 1 is a schematic diagram of a method for configuring an absolute grant mapping relationship table for a Node B of a drift radio network controller by a serving radio network controller according to embodiment 1 of the present invention.

In the present embodiment, a serving radio network controller informs a Node B of an absolute grant mapping relationship table that can be used by an E-AGCH by a radio link setup request or a radio link addition request, as shown in FIG. 1:

step 110, the serving radio network controller sends a radio link setup request message or a radio link addition request message to a drift radio network controller, the message carrying an identification number of an absolute grant mapping relationship table that can be used by an E-AGCH of the drift radio network controller, and the identification number of the absolute grant mapping relationship table being consistent with that of an absolute grant mapping relationship table of which a UE is informed via an air interface to use;

step 120, the drift radio network controller stores the configuration information, and then sends a radio link setup response message or a radio link addition response message to the serving radio network controller.

Embodiment 2

Figure 2:
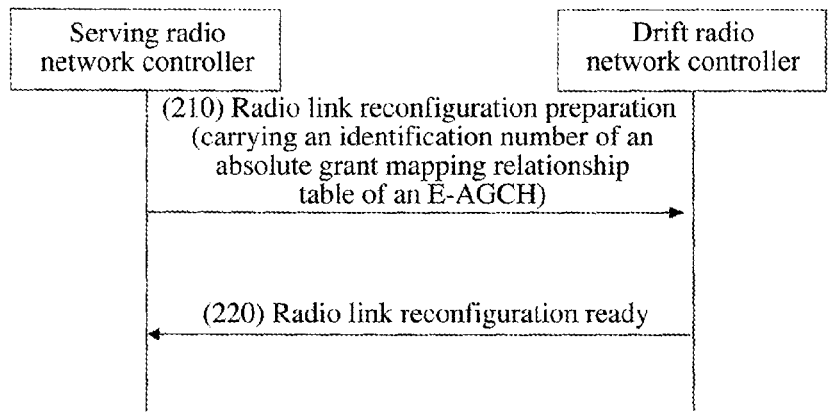
FIG. 2 is a schematic diagram of a method for configuring an absolute grant mapping relationship table for a Node B of a drift radio network controller by a serving radio network controller according to embodiment 2 of the present invention.

In the present embodiment, a serving radio network controller informs a drift radio network controller of an absolute grant mapping relationship table that can be used by an E-AGCH according to a radio link synchronous reconfiguration flow, as shown in FIG. 2:

step 210, the serving radio network controller sends a radio link reconfiguration preparation message to the drift radio network controller, the message carrying an identification number of an absolute grant mapping relationship table that can be used by an E-AGCH, and the identification number of the absolute grant mapping relationship table is consistent with that of an absolute grant mapping relationship table of which a UE is informed via an air interface to use;

step 220, the drift radio network controller forwards the radio link reconfiguration preparation message to a Node B of it, and then sends a radio link reconfiguration ready message to the serving radio network controller.

Embodiment 3

Figure 3:
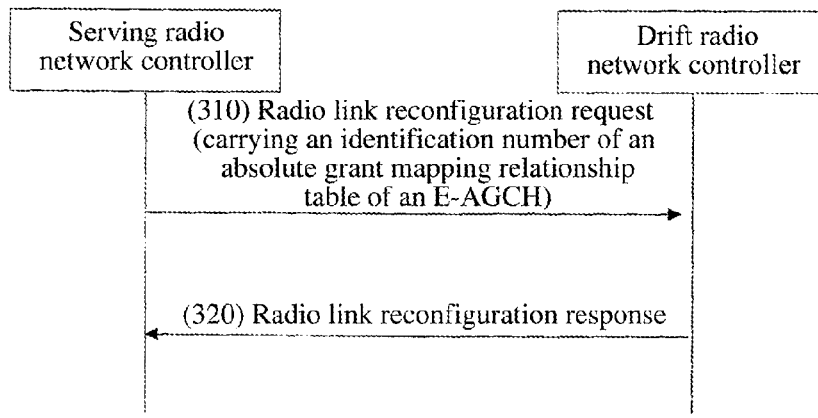
FIG. 3 is a schematic diagram of a method for configuring an absolute grant mapping relationship table for a Node B of a drift radio network controller by a serving radio network controller according to embodiment 3 of the present invention.

In the present embodiment, a serving radio network controller informs a drift radio network controller of an absolute grant mapping relationship table of a Node B that can be used by an E-AGCH according to a radio link asynchronous reconfiguration flow, as shown in FIG. 3:

step 310, the serving radio network controller sends a radio link reconfiguration request message to the drift radio network controller, the message carrying an identification number of an absolute grant mapping relationship table that can be used by an E-AGCH, and the identification number of the absolute grant mapping relationship table is consistent with that of an absolute grant mapping relationship table of which a UE is informed via an air interface to use;

step 320, the drift radio network controller stores the configuration message, and then sends a radio link reconfiguration response message to the serving radio network controller.

In the above three embodiments, the drift radio network controller may further send the identification number of the absolute grant mapping relationship table to a Node B under its control, and the Node B is just the Node B where the corresponding UE is located.

Note that the absolute grant mapping relationship tables in the above three embodiments may be the absolute grant mapping relationship table shown in FIG. 1 or FIG. 2, of which the identification number may be 0 and 1 respectively.

INDUSTRIAL APPLICABILITY

The present invention is applicable to radio communication systems such as WCDMA, TD-SCDMA, CDMA2000, Wimax etc.

What we claimed is:

1. A method for configuring an absolute grant mapping relationship table for a drift radio network controller, comprising:
   a serving radio network controller informing the drift radio network controller of the absolute grant mapping relationship table used by an enhanced-dedicated channel absolute grant channel (E-AGCH) by sending a signal, wherein the absolute grant mapping relationship table comprises relationships between absolute grant values and indexes, wherein the signal sent by the serving radio network controller is one of a radio link setup request message, a radio link addition request message, a radio link reconfiguration preparation message, and a radio link reconfiguration request message;
   wherein, if the signal sent by the serving radio network controller is a radio link setup request message or a radio link addition request message, after receiving the radio link setup request message or the radio link addition request message, the drift radio network controller sends a radio link setup response message or a radio link addition response message to the serving radio network controller;
   wherein, if the signal sent by the serving radio network controller is a radio link reconfiguration preparation message, and after receiving the radio link reconfiguration preparation message, the drift radio network controller sends a radio link reconfiguration ready message to the serving radio network controller; and wherein, if the signal sent by the serving radio network controller is a radio link reconfiguration request message, and after receiving the radio link reconfiguration request message, the drift radio network controller sends a radio link reconfiguration response to the serving radio network controller;

wherein, informing the drift radio network controller of the absolute grant mapping relationship table used by the E-AGCH comprises including an identification number, identifying the absolute grant mapping relationship table, in the signal sent by the serving radio network controller.

2. The method of claim 1, wherein,
the absolute grant mapping relationship table is consistent with an absolute grant mapping relationship table which is informed to a respective E-AGCH of a user equipment via an air interface to be used by the respective E-AGCH of said user equipment.

3. The method of claim 1, wherein,
the identification number of the absolute grant mapping relationship table ranges from 0 to 1.

4. The method of claim 1, wherein,
the absolute grant mapping relationship table is a table of relationships between absolute grant values and indexes before 16QAM is introduced, or a table of relationships between absolute grant values and indexes after 16QAM is introduced; content of the absolute grant mapping relationship table includes two items: index numbers and the corresponding absolute grant values.

5. The method of claim 1, wherein,
the serving radio network controller is a radio network controller responsible for communication between a user equipment and a core network; and the drift radio network controller is a radio network controller responsible for signaling and data transmission for the user equipment but not responsible for the communication between the user equipment and the core network.

* * * * *